United States Patent [19]

Goldsworthy et al.

[11] 4,032,383

[45] June 28, 1977

[54] FIBER INSERTION DEVICE FOR CONTINUOUS 3D FOAMING MACHINE AND METHOD

[75] Inventors: William B. Goldsworthy, Palos Verdes; Harald E. Karlson, Santa Monica, both of Calif.

[73] Assignee: McDonnell Douglas Corporation, Long Beach, Calif.

[22] Filed: Nov. 4, 1975

[21] Appl. No.: 628,802

[52] U.S. Cl. .................................. 156/79; 28/140; 156/73.6; 156/180; 156/257; 156/267; 156/436; 156/497; 220/9 F; 264/45.8; 264/69; 428/310; 428/313

[51] Int. Cl.² .......................................... B32B 5/20

[58] Field of Search ............ 156/79, 180, 148, 257, 156/267, 433, 73.6, 436, 497; 156/176; 428/310, 313; 28/72.2 F, 1 SM; 264/69, 45.8; 220/9 F

[56] References Cited

UNITED STATES PATENTS

| | | | |
|---|---|---|---|
| 3,031,733 | 5/1962 | Ljung et al. | 28/1 SM |
| 3,110,642 | 11/1963 | Harrington et al. | 156/180 |
| 3,145,446 | 8/1964 | Sussman | 28/72.2 F |
| 3,266,969 | 8/1966 | Makansi | 28/72.2 F |
| 3,341,912 | 9/1967 | Dyer et al. | 28/72.2 F |
| 3,669,819 | 4/1970 | Bischoff | 156/148 |
| 3,881,972 | 5/1975 | Long | 156/148 |
| 3,931,881 | 1/1976 | Bickel et al. | 156/79 |
| 3,951,718 | 4/1976 | Gonzales | 156/79 |

*Primary Examiner*—Edward G. Whitby
*Attorney, Agent, or Firm*—Max Geldin

[57] ABSTRACT

A method and apparatus are described for the making of a three dimensional filament reinforced foam insulation member. Generally parallel arrays of vertically stacked fabric or cloth having filaments running in an X-Y axis are reinforced by third axis Z directional filaments pre-cut to a desired length and inserted down through openings referred to as vertical columns hereinafter through the said array. The Z filaments are air directed through the stack of open weave. After the formation of the filament reinforced weave the assembly is impregnated with foam to form a unitary member. The apparatus to form the article and carry out the method above consists of a conveyor carrying stacked open weave fabric through an open ended enclosure wherein there are provided first vertical tubes and second vertical tubes. The second vertical tubes are injected into the stack or array of open weave. The first vertical tubes are telescopically inserted into the tops of the said second vertical tubes. A filament is fed vertically downwardly into the first vertical tube and cut to a predetermined length. Compressed air in a chamber surrounding the said first vertical tube assists in forcing the filaments into the said second vertical tube. The said second vertical tube may be vibrated to prevent hang up of the desired Z directional filament. The said second set of vertical tubes are retracted from the array after the array is completely reinforced with Z directional filament. Thereafter foam insulating may fill the reinforced array. Additional cutters may be provided for trim purposes to remove ex/:ess Z directional filaments extending above the arr/.y.

18 Claims, 11 Drawing Figures

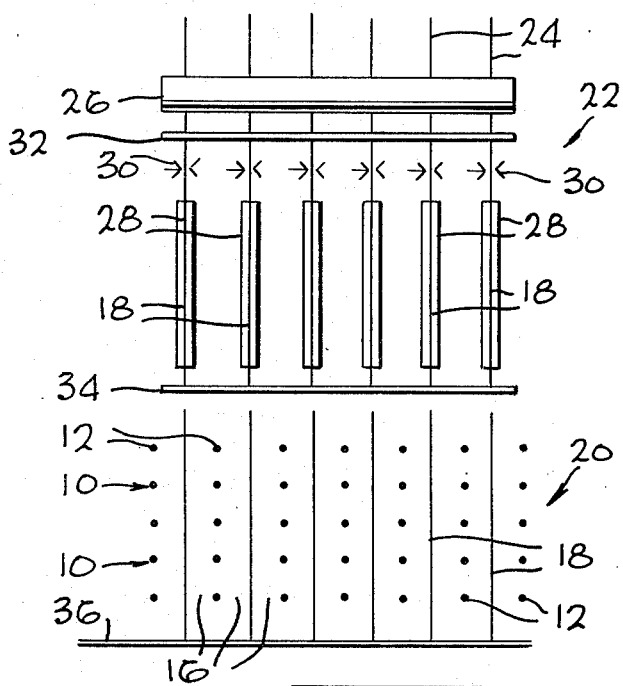
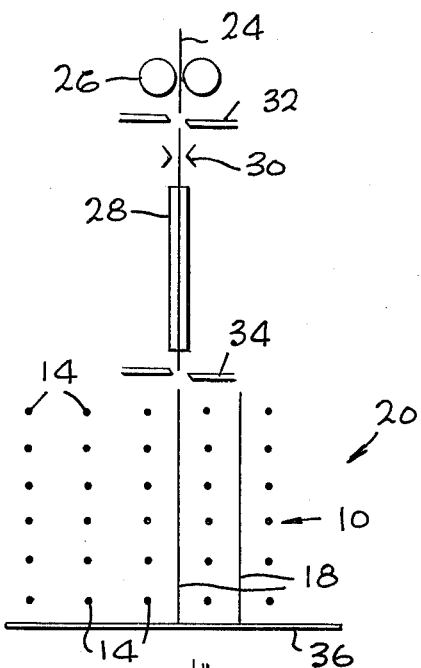
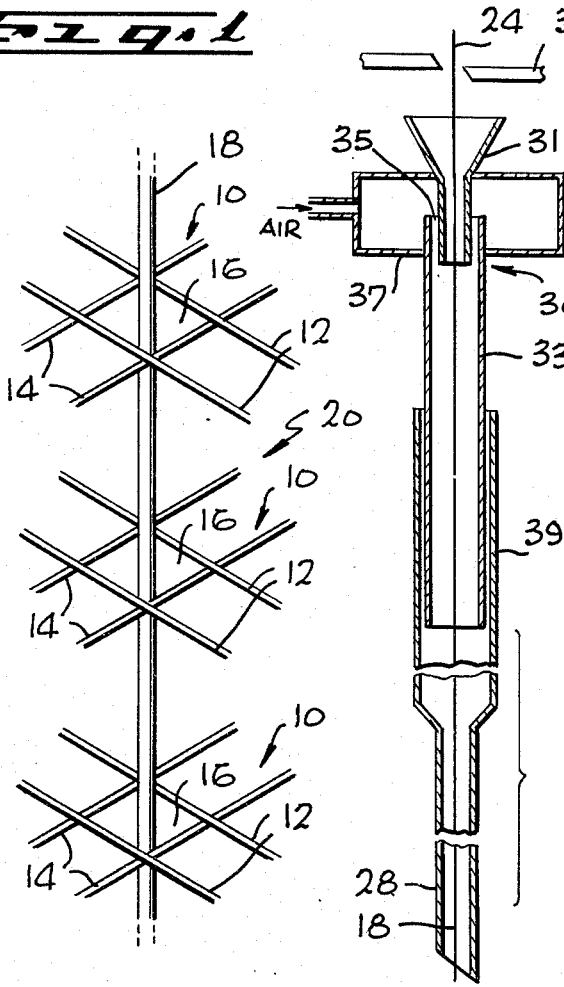
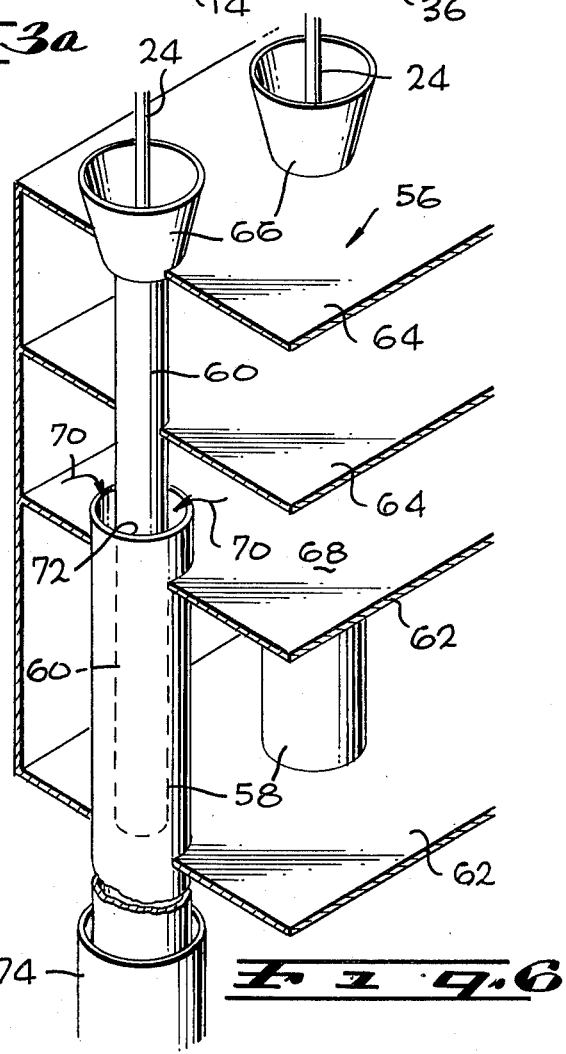

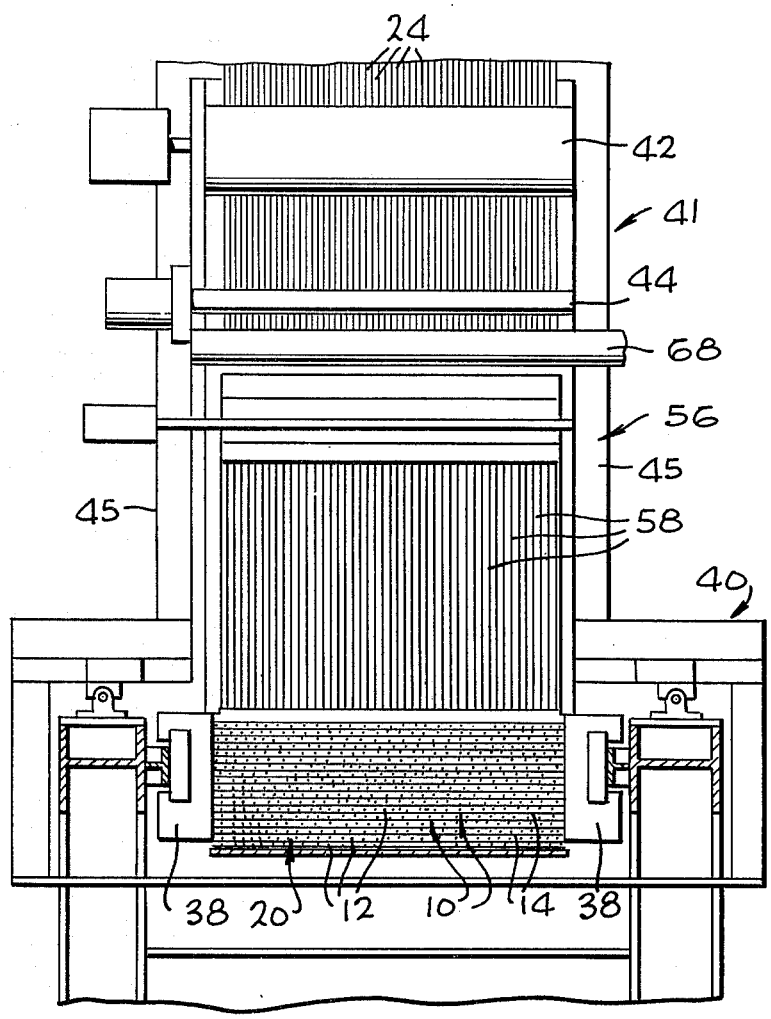
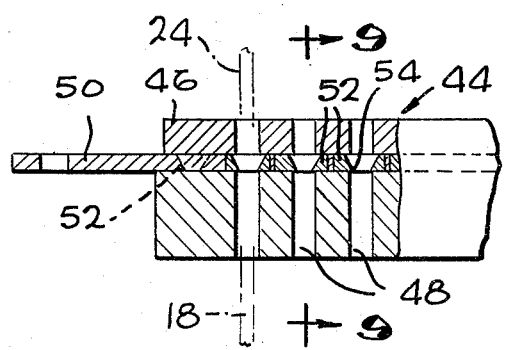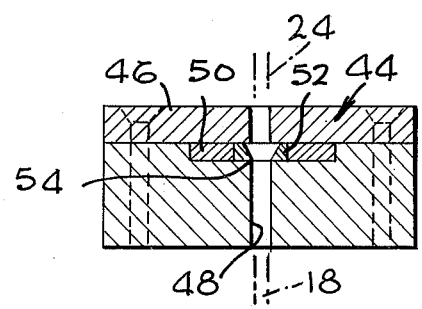

FIBER INSERTION DEVICE FOR CONTINUOUS 3D FOAMING MACHINE AND METHOD

BACKGROUND OF THE INVENTION

This invention relates to urethane foam which is orthogonally reinforced with filaments to provide an effective cryogenic thermal insulation, and is particularly concerned with the provision of novel apparatus and a novel method for inserting fiber, particularly glass, filaments as the Z or third axis vertical filaments of an orthogonal reinforcement including X or longitudinal filaments and Y or transverse filaments, for use as reinforcement in producing urethane foam cryogenic insulation.

In our copending application Ser. No. 516,412 filed Oct. 21, 1974, now abandoned, and in our copending application Ser. No. 669,819, filed Mar. 24, 1976, which is a continuation-in-part of Ser. No. 516,412, there is disclosed a method of continuously forming three-dimensional filament reinforced foam insulation by extending Z or vertically disposed fibers through vertically spaced layers of spaced X fibers in the longitudinal direction and spaced Y fibers in a transverse direction. Although this method has been found effective, it necessitates the formation of an arrangement employing four strands of Z fibers for each opening between the X and Y fibers, and wherein lengths of such initially parallel strands are brought together at spaced intervals to form a chain of alternate grouped and spaced fibers forming segments. This is a relatively complex procedure and operation.

It is of importance to insert vertical of Z fibers in layers of X and Y fibers in providing fiber reinforcement for urethane foam insulation in order to achieve load bearing qualities for the final cryogenic insulation foam products. The fibers carry tensile and compressive loads to transmit and distribute plank to plank forces through the adhesive system which cements the urethane foam insulation planks into a continuous multi-layered structure to provide an operational cryogenic thermal insulation system. For this purpose, the Z fibers, e.g. fiberglass yarn, are inserted into the multi-layered X-Y grid, the Z yarns preferably being stiffened as by a coating of cured resin. The X-Y-Z array of reinforcement fibers is then filled with foam, such as polyurethane rigid closed cell foam, so that all of the array yarns are fully captured, the resulting urethane foam planks then being fully load bearing.

One use of such reinforced cryogenic foam insulation is in insulating compartments or holds of marine vessels used to transport liquid natural gas (LNG). Another important application is in insulating static cryogenic liquid tanks or containers.

It is accordingly an object of the present invention to provide novel apparatus and a novel method for inserting third axis of Z fibers into an orthogonal reinforcement formed of layered X-Y fibers, to provide reinforcement for cryogenic foam insulation. A particular object is the provision of novel and simple apparatus and a simple method for efficiently inserting a single strand, or a group of strands, e.g. of glass fiber, preferably impregnated with a stiffening resin, into vertically aligned openings between X and Y oriented fibers in vertically stacked X-Y layers, to form an X-Y-Z reinforcement array which can be filled with foam insulation to provide a cryogenic thermal insulation.

BRIEF DESCRIPTION OF THE INVENTION

According to the present invention there is provided a method and apparatus particularly designed for rapidly and simply inserting vertical or Z fibers into an array formed of layers of spaced longitudinal X fibers and spaced transverse Y fibers, to form an X-Y-Z reinforced multi-layered array of fibers or filaments which is embedded in foam insulation, preferably in a continuous process. In accordance with the invention such Z fibers are blown by air into the layers of X-Y fibers and the array.

The apparatus for carrying out the method includes a machine for feeding X fibers or filaments longitudinally and Y fibers or filaments transversely, in multiple parallel layers of X and Y filaments, along a path of travel, the Y filaments being held between suitable means such as hooks, clips or pins, mounted on side plates which ride on side rails for the length of the machine. The X and Y filaments may or may not be, attached at their cross-over points. Each X-Y grid has an opening therein, e.g. a ⅜ inch opening, and preferably the X-Y grids of adjacent layers of X-Y fibers are vertically spaced, with the X-Y grids of adjacent layers being vertically aligned.

In another embodiment of orthogonal reinforcement, the X and Y fiber layers can be initially fabricated into a flat open-weave cloth or fabric or screening such as scrim cloth, such that there are discrete openings in the X-Y grids for the insertion of the Z fibers. Such screenlike material can be stacked several layers one over the other, and if desired spaced a discrete distance apart. Here again, the X-Y grids of the respective layers are arranged in vertical alignment.

In either of the above noted embodiments, the alignment of the vertically stacked X-Y fiber layers, preferably in spaced substantially parallel relation, provides open vertical columns for the insertion of the third axis or Z fibers perpendicular to the X-Y fibers. According to the present invention, apparatus is provided for blowing straight, stiffened Z fibers, preferably glass filament fibers, into such open vertical columns formed by the X-Y grids of adjacent vertically stacked layers of X-Y fibers.

Thus, according to one embodiment, continuous filaments of glass fibers which have been resin impregnated and heat cured so that they are relatively stiff are continuously fed by pinch rollers or other clamp type or friction drive into the insertion device. Such device consists of a row of tubes vertically oriented so that each tube is centered directly above each open vertical column formed by several layers of X-Y filamentary fibers or scrim cloth. Nozzle means is provided with respect to each vertical tube, for air injection. One shear type cutter is located directly above the row of nozzles and another identical cutter may be located directly below the row of tubes.

In operation, the pinch rollers drive the Z fibers through the open cutter on the top, and through the tubes approximately to the lower cutter, when employed, or to the length desired as determined by either timing the pinch rollers or by other standard sensing means such as reed switches, light and photocell. At this point, the top cutter actuates and cuts all of the filaments which are driven by the air directly into the array of X-Y fiber layers below. The second cutter may then be actuated to insure that should a Z fiber of filament lag, not enter the array completely, or not be completely severed, it will be cut by the second cutter and the array can advance without malfunction. The array is automatically advanced by means provided on the main 3D foam machine.

In a preferred embodiment, a second row of vertically oriented tubes is provided which are coaxially positioned below the first row of tubes, and means is provided for imparting Z axis motion to such second row of Z fiber injector tubes, to permit the latter tubes to penetrate the X-Y layers of the array down to the last X-Y grid layer in the stack so as to physically part the X-Y grid yarns to insure complete injection of the Z fibers throughout the array. The cut Z fibers introduced into the first row of upper tubes are injected by air into the lower row of tubes in the array. The lower injector tubes can then be withdrawn from the array, leaving the Z fibers inserted in vertical position in the array. Preferably there is also provided means to vibrate the injector tubes to impart a controlled vibrating motion to the lower injector tubes during their insertion or during their withdrawal or retraction, from the X-Y stacked layers of the array, in order to prevent Z fiber hang-up within the array.

In the above embodiment, only one shear cutter for the Z fibers need be employed, namely the upper cutter, the lower cutter being omitted.

As previously noted, in practice several Z insertion stations can be used and positioned some distance apart for accessibility and to allow the advance of the X-Y fiber array at a greater speed than could be successfully filled with Z fibers by a single insertion station. Further, orientations of the Z fibers other than the vertical orientation can be employed in the Z insertion method of the invention.

Following formation of the X-Y-Z reinforcing multi-layered array of fibers, according to the invention, such array is embedded in foam insulation, such as closed cell urethane foam or equivalent foam, by means of a standard mixing and metering machine for the foam components, which discharges the foam for example onto a moving belt positioned beneath the filamentary reinforcing array. Both the array and belt supporting the foaming material move in the same direction and at the same rate. The lower moving belt of foam is then brought into close proximity to the filamentary array, and the foam material froths upwardly through the filamentary array, and the foam is permitted to cure as the foam embedded array moves to the end of the machine. After sufficient cure, the foamed array is cut from supporting elements of the machine, such as tenter frames, chains or belts, and is then cut to the approximate desired length for producing foam insulation planks.

BRIEF DESCRIPTION OF THE DRAWINGS

FIG. 1 illustrates insertion of a vertical Z fiber between the vertically aligned X-Y grids of a plurality of stacked spaced layers of X-Y fibers;

FIG. 2 is an essentially schematic elevational illustration of a device for inserting Z fibers into an array of stacked layers of X-Y fibers, according to the invention;

FIG. 3 is a schematic illustration of a side view of the device illustrated in FIG. 2;

FIG. 3a illustrates a tube and nozzle system for Z fiber injection into the X-Y fiber array of FIG. 2;

FIG. 5 is a front elevation of a machine of the type illustrated in FIG. 4;

FIG. 6 is a perspective view of a nozzle means in conjunction with the Z fiber insert tubes and the air supply system to create the desired downward thrust on each Z fiber, provided in the machine illustrated in FIGS. 4 and 5;

FIG. 8 is a sectional detail showing the cutting mechanism for cutting the Z fibers to the desired length employed in the machine of FIGS. 3 and 4;

FIG. 9 is a sectional view taken on line 9—9 of FIG. 8; and

DETAILED DESCRIPTION OF ILLUSTRATIVE EMBODIMENTS

Figure 4:
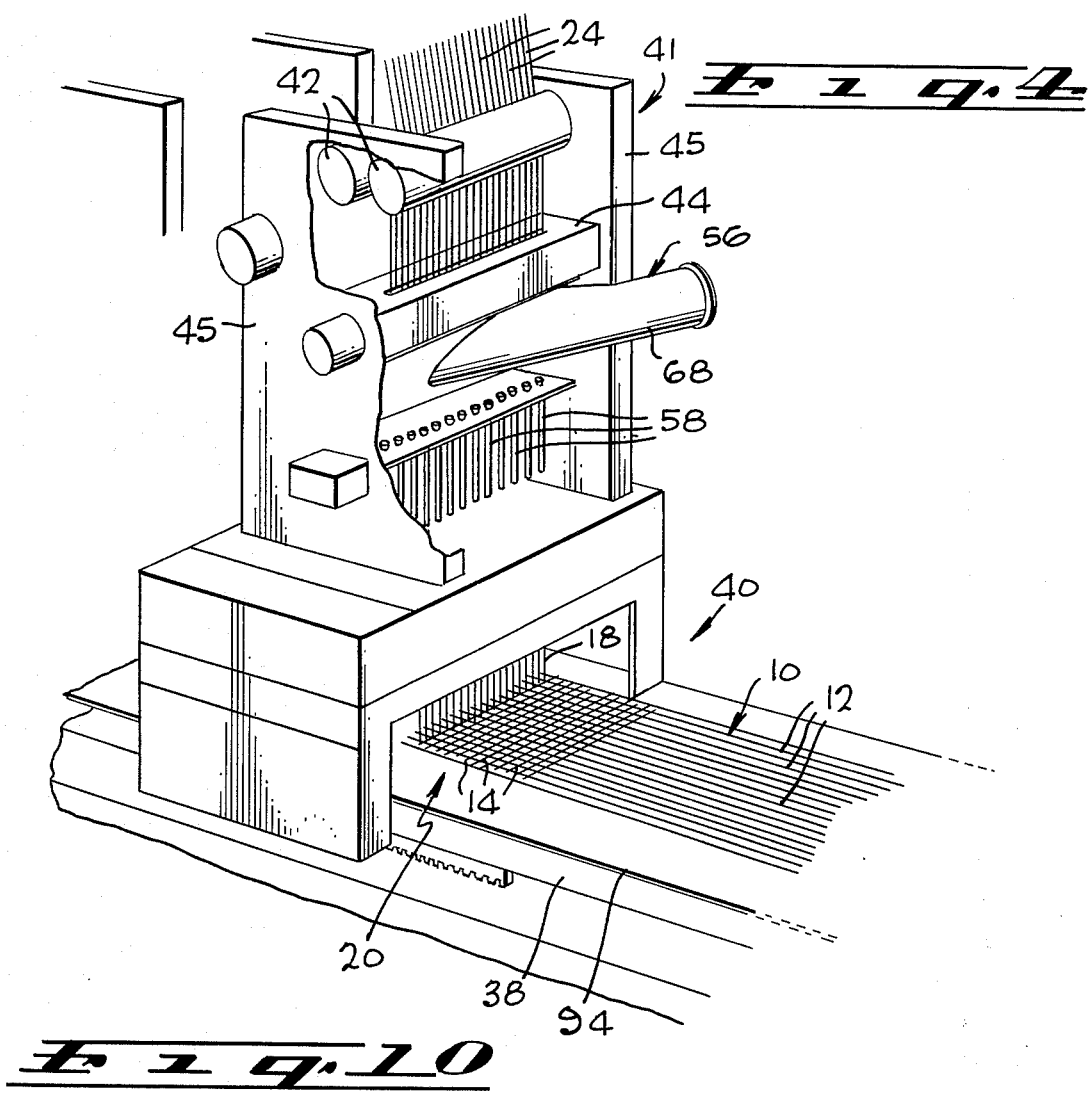
FIG. 4 is a perspective view of a machine for insertion of Z fibers into an X-Y array of layers of X-Y fibers according to the invention.

In a typical three-dimensional reinforced insulation plank produced employing the invention process, layers of X oriented fibers extend longitudinally throughout the plank, with the fibers spaced from each other, e.g. ⅜ apart, and layers of Y oriented fibers extend transversely across the width, with the fibers also spaced, e.g. ⅜ apart. Thus, referring particularly to FIG. 1 of the drawing, there is shown a plurality of spaced parallel layers 10 of fibers, each formed of longitudinal X fibers 12 and transverse Y fibers 14, forming a grid of squares 16, e.g. of ⅜ size. As seen in FIG. 1, the respective layers 10 of X-Y fibers are positioned so that the square grids 16 of the respective layers are in vertical alignment. There is thus formed vertically stacked X-Y squares into which one or more vertical or Z oriented fiber or fibers, indicated at 18, is injected, for each vertically aligned row of such squares, to form an X-Y-Z orthogonal array. The X-Y fibers may or may not be bonded together at their cross-over points of contact. If the fibers have been pre-impregnated, e.g., coated with a resin, such bonding may be accomplished by simply heating at a suitable elevated temperature, e.g. for 10 to 15 seconds. If the fibers have not been previously coated, they may be sprayed or dipped into a resin after the array has been formed, and then heated to bond the fibers together where they contact each other. The Z fibers 18 are preferably initially resin impregnated and heat cured so that they are relatively stiff prior to insertion into the array, indicated at 20 in FIG. 1 of the stacked layers 10 of X and Y fibers.

One form of apparatus which can be employed for inserting the Z fibers into the array formed of the stacked layers of X and Y fibers is schematically illustrated in FIGS. 2 and 3. The array 20 formed of the stacks of layers 10 of X-Y fibers is positioned by the machine at a Z insertion station, directly below a device, indicated at 22, for inserting the Z threads 18 into the array 20, according to the invention. Continuous fibers or filament yarns, preferably glass filament yarns 24, from which the Z fibers are cut, are continuously fed to a clamping device 26, which can be in the form of pinch rollers or other form of clamping device. The filaments 24 have been resin impregnated, e.g. with a polyester resin, and cured so that they are relatively stiff. A row of tubes 28 are vertically oriented so that each tube is centered directly above each open vertical column of grid squares 16 formed by several layers 10 of X-Y fibers or scrim cloth. A nozzle means indicated generally at 30, is located above each vertical tube and air, e.g. at 10 psi, is fed into each nozzle 30 and parallel to the nozzle axis.

FIG. 3a illustrates the tube and nozzle means schematically shown in FIG. 2. The nozzle means 30 can be in the form of a short tube 31 partially received axially within the upper open end of an outer tube 33, providing an annular opening 35 for air introduced into housing 37, the lower end of tube 33 of nozzle means 30 being received in an enlarged upper end 39 of tube 28. It will be understood that other types of nozzle means, such as a tube 33 with a venturi type opening can be employed.

A shear type cutter indicated at 32 is located directly above the row of nozzles indicated 30, and another similar shear cutter 34 is located directly below the row of vertical tubes 28.

The pinch rollers 26 drive the continuous glass filaments 24 through the cutter 32 at the top, in open position, through the nozzles indicated at 30 and through the tubes 28 to approximately the lower cutter 34. When the filaments 24 fed by the pinch rollers 26 are of the desired length and reach their lowermost position at the lower cutter 34, which is determined by the number of revolutions of the pinch rollers 26 or by any suitable sensing means, the top cutter 32 actuates to cut all of the filaments 24 into suitable length Z fibers 18, and as soon as such cutting is accomplished the resulting Z fibers are driven by the air introduced into the nozzle means 30 downwardly through tubes 28 and the open lower cutter 34, and into the respective vertically aligned square grids 16 of the X-Y array 20 to a lower stop 36. The second cutter 34, which is positioned a short distance above the array 20 is then actuated to insure that in the event a Z fiber 18 has not entered the array completely and hence protrudes above the array, it is cut so that the array 20 with the Z fibers inserted can then advance without interruption.

The array 20 containing the injected Z fibers 18 is then advanced to succeeding suitably spaced stations containing Z insertion devices similar to 22 so as to completely fill the array 20 with the Z fibers 18. After the X-Y array is filled with the Z fibers to form the X-Y-Z reinforcement array, a urethane or equivalent foamable material is then foamed through the array to embed or encapsulate it within the foamy material. When the foaming action has been completed and the resultant material solidified or cured so it can be handled, the material is cut from the apparatus holding the array in place, and then cut into planks of reinforced insulation foam for convenient handling, shipping, and installing for use.

Referring now to FIGS. 4 to 10 illustrating preferred embodiments of the invention, layers 10 of fiberglass scrim cloth formed of longitudinal X fibers 12 and transverse Y fibers 14, in vertically stacked parallel relation are simultaneously driven longitudinally by suitable means (not shown) between longitudinal side frames 38 of the machine 40. The X-Y array 20 of stacked layers of scrim cloth is positioned adjacent to Z insert station 41 positioned above the array 20.

At the Z insert station a row of continuous resin impregnated and stiffened fiber glass filament yarns 24 are fed to a pair of pinch rollers 42 and through an open cutter mechanism 44 below the pinch rollers 42, suitably mounted on upstanding side frames 45 of the machine. Such cutter mechanism 44, as seen in FIGS. 8 and 9, is comprised of a block 46 containing parallel vertical bores 48 for passage of the yarn 24, and containing a transversely disposed movable blade 50 containing carbide cutting inserts indicated at 52, with cutting edges 54 for shearing and severing the yarn 24 when the blade 50 is laterally actuated from the position indicated in FIGS. 8 and 9, to a position wherein the carbide inserts 52 of the cutting blade are out of alignment with the bores 48 in the block 46, as indicated by the dotted line position of one of the elements 52.

Just below the shear cut-off until 44 and mounted on side frames 45 is located a unit 56 which receives the Z fibers 24 fed from the pinch rolls 42. Viewing FIGS. 6 and 7, such unit is comprised of a row of vertically positioned parallel feed tubes 58 for receiving the fibers 24. Referring particularly to FIG. 6, upper tubes 60 are provided coaxially with tubes 58, the lower ends of each of tubes 60 being received within the upper open end of tubes 58 which have a larger internal diameter than the external diameter of tubes 60. Tubes 58 and 60 are mounted on plates 62 and 64, respectively, the upper tubes 60 being flared outwardly at 66 to aid in receiving the fibers 24.

An air plenum 68 is provided between the adjacent plates 62 and 64, which is supplied with low pressure high volume air. As illustrated by arrows 70, air from the air plenum 68 passes into the annulus 72 between the coaxially arranged tubes 58 and 60, developing a substantial downward force or thrust on each Z fiber 24. When the desired predetermined length of Z fibers enter the coaxially arranged tubes 58 and 60, pinch rolls 42 actuated to cease further downward feeding of the Z fibers 24 and the shear cutter blade 50 actuates to cut the Z yarn 24 into fibers 18 of the required length, and such shear operation turns loose the cut strands or fibers 18 of predetermined length and the downward thrust of the air passing through the annulus 72 between the coaxial tubes 58 and 60 injects the fibers into the grids 16 between the stacked layers of X and Y fibers 12 and 14 of the array 20, as seen in FIGS. 1 to 3.

As a further feature of the invention, viewing FIGS. 6 and 10, there can be provided below the fixed row of tubes 58, a row of vertically positioned parallel axially moveable tubes 74 mounted on a cross member 75 supported on a vertically moveable carriage 76, which can be suitably mounted on the machine at the Z insert station 41 below the Z fiber receiving until 56. The tubes 74 are coaxial with the fiber feed tubes 58, the tubes 74 having an inside diameter somewhat larger than the other diameter of tubes 58, and mounted for a simple slip fit over the lower end portions of the tubes 58 for vertical movement of tubes 74 with respect to tubes 58. The tubes 74 are mounted on the carriage 76 to permit vertical motion of all of tubes 74 together. Bushings 78 and shafting 80 are provided to guide the carriage 76 and the tubes 74 for axial vertical motion with respect to the tubes 58, and means indicated at 82, including a torque arm 84 and links 86 connecting the torque arm 84 and the carriage 76 are provided for actuating the carriage 76 vertically for a limited distance either downwardly or upwardly at predetermined time intervals. The torque arm 84 can be actuated by a short stroke hydraulic cylinder 88 to power this vertical motion. The carriage 76 is operated to permit the injector tubes 74 to penetrate the array 20 of X-Y fibers down to the lowest X-Y grid level.

The carriage 76 carrying the injector tubes 74 is actuated by the hydraulic cylinder 88 to lower the carriage and tubes 74 down into the array of X-Y fibers 20, with each of the tubes 74 passing through the grids 16 between the X and Y fibers until the lower ends of the tubes 74 are at the bottom of the array 20 of the stacks of X-Y fibers. The shear cutter element 50 is then actuated to cut the X fibers into the fiber lengths 18 which are then injected by the air passing between coaxial tubes 58 and 60, into the tubes 74 penetrating the X-Y array 20. The carriage 76 is then actuated by the hydraulic cylinder 88 to raise the carriage and tubes 74 upwardly to their position around the lower portion of the tubes 58, as seen in FIG. 6, leaving the cut Z fibers remaining within the grids 16 of the array 20, as seen in FIGS. 1 to 3.

Figure 10:
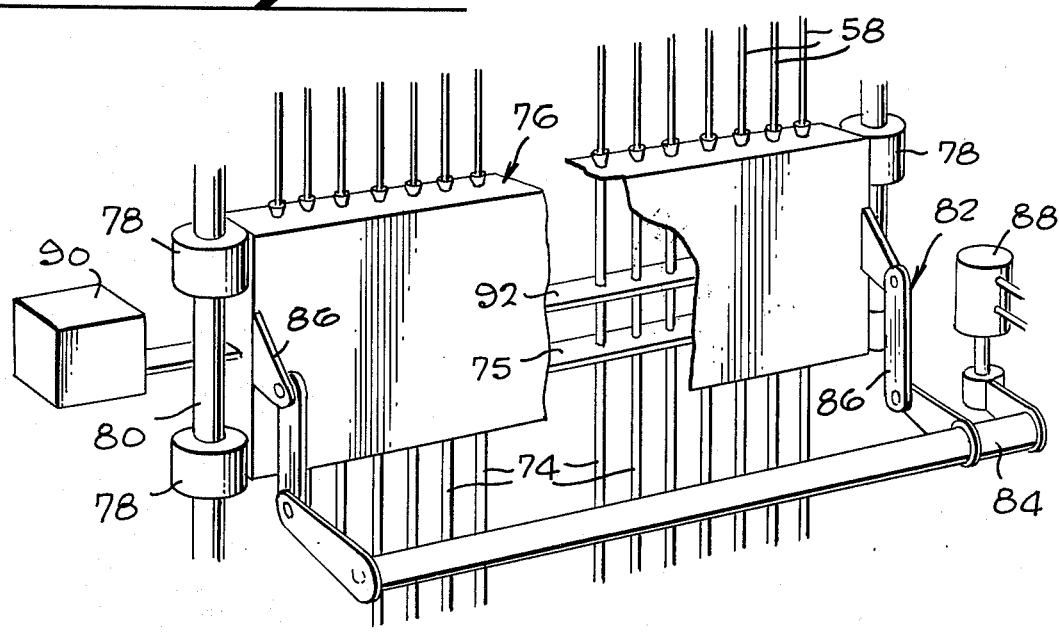
FIG. 10 is a perspective view showing mechanism for guiding a row of Z injector tubes for vertical motion to permit penetration of the tubes into an X-Y array, and also showing means for vibrating the tubes.
Figure 7:
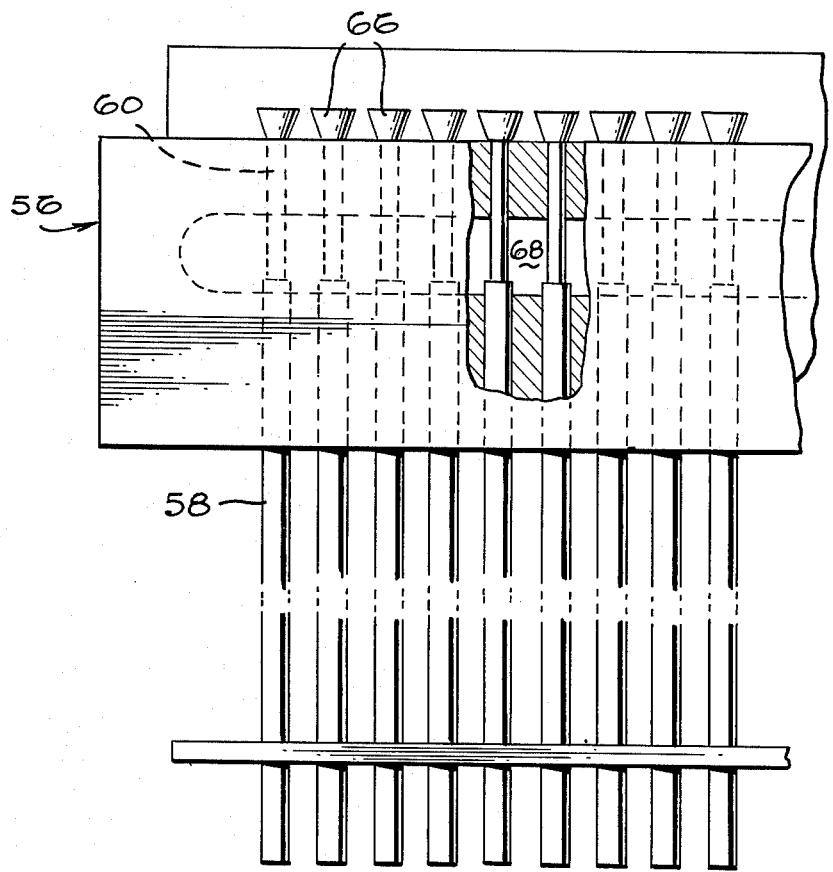
FIG. 7 is an elevational view of the row of Z insert tubes and structure for supplying air thereto.

There is also provided a vibrator unit 90, as seen in FIG. 10, which is connected by a bar 92 to all of the injector tubes 74. During upward movement of the carriage 76 from the position of tubes 74 within the array and releasing the Z threads 18 so that they remain in the array, the vibrator unit is actuated to provide a slight lateral vibrating motion to the tubes 74 to prevent Z strand hang-up within the array 20 as the tubes 74 are withdrawn from the array. If desired, the vibrator unit also can be actuated during lowering of the tubes 74 into the array 20, to facilitate passage of the tubes 74 into the grids 16 between the X and Y fibers of the respective layers of fibers.

It will be understood that the vertically movable unit 76 including the injector tubes 74 can be omitted and the machine thereby simplified if the array 20 of stacked layers of X-Y fibers are such that the grids 16 between X-Y fibers can be penetrated effectively by injecting the fibers 18 from the coaxial tubes 58 and 60 without the necessity for initially penetrating such grids with the tubes 74.

It will also be understood that the vertically movable unit 76 with the vertically movable tubes 74 can be utilized without employing the vibrator unit 90.

After the layers of X-Y fibers are filled with one row of Z fibers by the mechanism and procedure described above, the array 20 is then moved to a number of successive similar Z fiber insertion stations and at each station another row of Z fibers is inserted vertically into the vertically aligned squares 16 of the plurality of stacked layers of X-Y fibers.

The overall machine can be designed as a continuous 3D foaming machine and wherein the X-Y array of fibers continuously advances and does not stop or dwell during Z fiber insertion. In this mode of operation, it is thus necessary that the Z fiber insertion mechanism of the invention be capable of moving with the X-Y fiber array during Z fiber insertion and to return to its initial starting position prior to its next insertion. For this purpose, suitable mechanism is provided to impart a limited longitudinal forward motion to the Z insertion mechanism during the Z fiber insertion operation, and to impart a return motion to the Z insertion mechanism to place it at its initial starting position for the next Z fiber insertion operation. Since the mechanism for providing such limited forward and return motion of the Z insertion mechanism forms no part of the present invention, it is not described in detail herein.

While continuous non-stop movement of the array and foam material is the preferred mode, continuous intermittent movement from one Z fiber insert station to another can be practiced, and in some installations may be preferable.

As the X-Y stacked layers are filled with Z fibers, the array is ready for the foaming and encapsulation operation. This is carried out at a foaming station (not shown) where suitable chemicals for producing a foam insulation are applied to the array. These chemicals include the insulating material in liquid form, and activator to cause solidification, and a blowing agent to cause the material to foam up through the array before solidification occurs. Polyurethane producing reactants such as polyols and diisocyante, appropriate catalyst and a Freon gas are examples of such chemicals. These chemicals are pumped from suitable tanks onto a moving belt 94 which moves at the same rate as the fiber array, just below the array of fibers. The urethane or equivalent foam material foams up through the array. An endless belt (not shown) is positioned above the array to prevent the foam from moving the array upwardly as it passes through the array.

After sufficient solidification and curing of the foam, which occurs rapidly during travel of the array through the machine, the foam array is then separated from its supports on the machine and the belt 94 on which it is carried, and the foam is trimmed and cut into reinforced foam insulation planks of desired length.

The mechanism for introducing the foam into the array of X-Y-Z fibers, the curing of such foam and the removal of such foam from the machine and cutting same into desired lengths forms no part of the present invention and hence is not described in detail herein. Illustrative mechanism for this purpose is disclosed in our above copending application Ser. No. 516,412.

From the foregoing, it is seen that the invention provides novel and simple means and procedure for readily inserting Z vertical fibers into an array of longitudinal X and transverse Y fibers, to produce an efficient reinforcement for cryogenic foam insulation.

While we have described particular embodiments of our invention for purposes of illustration, it will be understood that various modifications of the invention can be made without departing from the spirit of the invention, and hence the invention is not to be taken as limited except by the scope of the appended claims.

What is claimed is:

1. A method of forming three-dimensional fiber reinforced foam insulation which comprises forming an array of layers of fibers, each said layer consisting of spaced X fibers extending in a longitudinal direction and spaced Y fibers extending in a transverse direction, and forming openings between adjacent X-Y fibers in said layers, providing tubes positioned above said array, providing additional tubes below said first mentioned tubes, inserting said additional tubes into said openings of said array, inserting Z fibers into said first mentioned tubes, blowing said Z fibers by air from said first mentioned tubes into said additional tubes in said array, withdrawing said additional tubes from said array, leaving said Z fibers inserted in said array to form an X-Y-Z matrix and foaming an insulation material through said matrix.

2. A method of forming three-dimensional fiber reinforced foam insulation as defined in claim 1, including the step of first cutting continuous stiffened filaments of fiber into predetermined lengths of stiffened Z fibers, followed by said blowing said Z fibers into said vertical open columns in said array.

3. A method of forming three-dimensional fiber reinforced foam insulation as defined in claim 1, including vibrating said additional tubes during said insertion thereof into or during said withdrawal thereof from said array.

4. A method of forming three-dimensional fiber reinforced foam insulation which comprises forming an array of layers of fibers, each said layer consisting of spaced X fibers extending in a longitudinal direction and spaced Y fibers extending in a transverse direction, and forming openings between adjacent X-Y fibers in said layers, and wherein said layers of said array are vertically stacked layers arranged in spaced substantially parallel relation, the openings between adjacent X-Y fibers of the respective layers being substantially aligned to provide vertical open columns through said array for the insertion therein of Z fibers, providing a row of tubes positioned above said array, providing a second row of tubes below and coaxially aligned with said first mentioned row of tubes, injecting said second row of tubes into said vertical open columns in said array, inserting continuous stiffened filaments of fiber into said first mentioned tubes, cutting said continuous filaments into predetermined lengths of stiffened Z fibers, blowing said Z fibers from said first mentioned row of tubes into said second row of tubes in said array, withdrawing said second row of tubes from said array, leaving said Z fibers inserted in said array to form an X-Y-Z matrix, and foaming an insulation material through said matrix.

5. A method of forming three-dimensional fiber reinforced foam insulation as defined in claim 4, including vibrating said second row of tubes during said injecting thereof into or during said withdrawal thereof from said array, to prevent Z fiber hang-up within the array.

6. A method of forming three-dimensional fiber reinforced foam insulation as defined in claim 5, wherein said continuous stiffened filaments are filaments of glass fibers which are resin impregnated.

7. A method of forming three-dimensional fiber reinforced foam insulation as defined in claim 4, including moving said array containing said inserted Z fibers to successive predetermined positions below successive other pairs of said first and second rows of said tubes, and successively repeating the method of claim 4, until substantially all of said vertical open columns in said array are filled with said Z fibers.

8. A method of forming three-dimensional fiber reinforced foam insulation which comprises forming an array of layers of fibers, each said layer consisting of spaced X fibers extending in a longitudinal direction and spaced Y fibers extending in a transverse direction, and forming openings between adjacent X-Y fibers in said layers, and wherein said layers of said array are vertically stacked layers arranged in spaced substantially parallel relation, the openings between adjacent X-Y fibers of the respective layers being substantially aligned to provide vertical open columns through said array for the insertion therein of Z fibers, providing a row of tubes positioned above said array, inserting continuous stiffened filaments of fiber into said tubes and cutting said continuous filaments into predetermined lengths of stiffened Z fibers, blowing said Z fibers from said tubes into said vertical open columns in said array, moving said array containing said inserted Z fibers to successive predetermined positions below successive other said rows of said tubes, and successively blowing said Z fibers from said tubes into additional said vertical open columns in said array, until substantially all of said open columns in said array are filled with said Z fibers to form an X-Y-Z matrix, and foaming and insulation material through said matrix.

9. A method of forming three-dimensional fiber reinforced foam insulation as defined in claim 8, wherein said continuous stiffened filaments are filaments of glass fibers which are resin impregnated.

10. A method of forming three-dimensional fiber reinforced foam insulation as defined in claim 8, including the step following said blowing said Z fibers into said array, of cutting any Z fibers extending above and not completely penetrating said array.

11. Apparatus for forming a three-dimensional fiber reinforcement for foam insulation, by inserting Z fibers into an array of layers of X-Y fibers, each said layer consisting of spaced X fibers extending in a longitudinal direction and spaced Y fibers extending in a transverse direction, and forming openings between adjacent X-Y fibers in said layers, said Z fibers inserted into said openings in said layers, which comprises means for supporting said array of X-Y fibers, tube means positioned above said array and oriented in a direction toward said array, means for feeding fibers into said tube means, means for cutting said fibers to a predetermined length to form Z fibers, means for blowing said cut Z fibers from said tube means and injecting said Z fibers into said openings between adjacent X-Y fibers of the respective layers of said array, and a second cutting means for cutting any Z fibers extending above said array after said Z fibers have been injected into said array.

12. Apparatus as defined in claim 11, including stop means at the bottom of said array to prevent further downward movement of said Z fibers after said Z fibers completely penetrate said array.

13. Apparatus for forming a three-dimensional fiber reinforcement for foam insulation, by inserting Z fibers into an array of layers of X-Y fibers, each said layer consisting of spaced X fibers extending in a longitudinal direction and spaced Y fibers extending in a transverse direction, and forming openings between adjacent X-Y fibers in said layers, said Z fibers inserted into said openings in said layers, which comprises means for supporting said array of X-Y fibers, tube means positioned above said array and oriented in a direction toward said array, means for feeding fibers into said tube means, means for cutting said fibers to a predetermined length to form Z fibers, means for blowing said cut Z fibers from said tube means and injecting said Z fibers into said openings between adjacent X-Y fibers of the respective layers of said array, and wherein said layers of said array are vertically stacked layers, the openings between adjacent X-Y fibers of the respective layers being substantially aligned to provide open columns through said array, said tube means comprising a plurality of tubes oriented downwardly toward said array, said fiber feeding means comprising means for feeding a plurality of continuous fibers, one continuous fiber to each of said tubes, said blowing means including air discharge means and means for supplying air under pressure to said air discharge means, said air discharge means arranged to provide a downward thrust on each of said cut Z fibers in said tubes, to inject said cut Z fibers into said open columns between the X-Y fibers of the respective layers in said array, said cutting means being a shear type cutter positioned above said tubes, and including means for actuating said cutter after said continuous fibers have entered said tubes to a predetermined length, and including a second shear cutter positioned below said tubes and above said array, and including means for actuating said second cutter after said Z fibers have been injected into said array, to cut any Z fibers extending above the array and not completely penetrating said array.

14. Apparatus for forming a three-dimensional fiber reinforcement for foam insulation, by inserting Z fibers into an array of layers of X-Y fibers, each said layer consisting of spaced X fibers extending in a longitudinal direction and spaced Y fibers extending in a transverse direction, and forming openings between adjacent X-Y fibers in said layers, said Z fibers inserted into said openings in said layers, which comprises means for supporting said array of X-Y fibers, tube means positioned above said array and oriented in a direction toward said array, means for feeding fibers into said tube means, means for cutting said fibers to a predetermined length to form Z fibers, means for blowing said cut Z fibers from said tube means and injecting said Z fibers into said openings between adjacent X-Y fibers of the respective layers of said array, and wherein said layers of said array are vertically stacked layers, the openings between adjacent X-Y fibers of the respective layers being substantially aligned to provide open columns through said array, said tube means comprising a plurality of tubes oriented downwardly toward said array, said fiber feeding means comprising means for feeding a plurality of continuous fibers, one continuous fiber to each of said tubes, said blowing means including air discharge means and means for supplying air under pressure to said air discharge means, said air discharge means arranged to provide a downward thrust on each of said cut Z fibers in said tubes, to inject said cut Z fibers into said open columns between the X-Y fibers of the respective layers in said array, and including a plurality of moveable injector tubes in coaxial alignment with said first mentioned tubes, means for actuating said injector tubes to permit said injector tubes to penetrate into said open columns between the X-Y fibers of the respective layers in said array, for receiving said cut Z fibers injected into said array, and to permit retraction of said injector tubes from said array, leaving said Z fibers in position in said array.

15. Apparatus as defined in claim 14, and including means for vibrating said injector tubes.

16. Apparatus for forming a three-dimensional fiber reinforcement for foam insulation, by inserting Z fibers into an array of layers of X-Y fibers, each said layer consisting of spaced X fibers extending in a longitudinal direction and spaced Y fibers extending in a transverse direction, and forming openings between adjacent X-Y fibers in said layers, said Z fibers inserted into said openings in said layers, which comprises means for supporting said array of X-Y fibers, tube means positioned above said array and oriented in a direction toward said array, means for feeding fibers into said tube means, means for cutting said fibers to a predetermined length to form Z fibers, means for blowing said cut Z fibers from said tube means and injecting said Z fibers into said openings between adjacent X-Y fibers of the respective layers of said array, and wherein said layers of said array are vertically stacked layers, the openings between adjacent X-Y fibers of the respective layers being substantially aligned to provide open columns through said array, said tube means comprising a plurality of tubes oriented downwardly toward said array, said tubes being disposed vertically and substantially parallel to each other, said tubes each being centered axially directly above the open vertical columns formed by the respective X-Y fiber layers in said array, said fiber feeding means comprising means for feeding a plurality of continuous fibers, one continuous fiber to each of said tubes, said blowing means including air discharge means and means for supplying air under pressure to said air discharge means, said air discharge means arranged to provide a downward thrust on each of said cut Z fibers in said tubes, to inject said cut Z fibers into said open columns between the X-Y fibers of the respective layers in said array, and including a plurality of vertically disposed substantially parallel injector tubes, each in coaxial alignment with one of said first mentioned tubes and adapted for vertical motion below said first mentioned tubes, means for actuating said injector tubes to permit said injector tubes to penetrate into said open columns between the X-Y fibers of the respective layers in said array, for receiving said cut Z fibers injected into said array, and to permit retraction of said injector tubes from said array, leaving said Z fibers in position in said array.

17. Apparatus as defined in claim 16, and including means for imparting a controlled vibrating motion to said injector tubes.

18. Apparatus as defined in claim 17, said air discharge means comprising a second tube concentrically mounted around each of said first mentioned tubes and forming an annulus between said tubes, said means for supplying air to said air discharge means comprising a plenum communicating with said annulus between each pair of concentrically arranged tubes.

* * * * *